(12) United States Patent
Musgrove et al.

(10) Patent No.: US 10,375,758 B2
(45) Date of Patent: Aug. 6, 2019

(54) WI-FI COMMUNICATION OF WIRELESS EMERGENCY ALERTS

(71) Applicant: AT&T Intellectual Property I, L.P., Atlanta, GA (US)

(72) Inventors: Charles Musgrove, Henderson, NV (US); DeWayne Sennett, Redmond, WA (US); Brian Daly, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 34 days.

(21) Appl. No.: 15/434,724

(22) Filed: Feb. 16, 2017

(65) Prior Publication Data

US 2018/0235015 A1 Aug. 16, 2018

(51) Int. Cl.
| H04W 4/00 | (2018.01) |
|---|---|
| H04W 76/50 | (2018.01) |
| H04W 4/02 | (2018.01) |
| H04W 4/90 | (2018.01) |
| H04W 84/12 | (2009.01) |

(52) U.S. Cl.
CPC ............. *H04W 76/50* (2018.02); *H04W 4/02* (2013.01); *H04W 4/90* (2018.02); *H04W 84/12* (2013.01)

(58) Field of Classification Search
CPC ......... H04W 76/50; H04W 4/90; H04W 4/02; H04W 84/12
See application file for complete search history.

(56) References Cited

U.S. PATENT DOCUMENTS

| 8,315,590 | B2 * | 11/2012 | Hapsari | ............... H04L 12/1895 455/404.1 |
|---|---|---|---|---|
| 8,842,810 | B2 | 9/2014 | Lieu | |
| 9,271,135 | B2 | 2/2016 | Dunn et al. | |
| 9,293,023 | B2 | 3/2016 | Zhang | |
| 9,419,733 | B2 | 8/2016 | Marathe et al. | |
| 2007/0194906 | A1 | 8/2007 | Sink | |
| 2009/0163170 | A1 | 6/2009 | Norp et al. | |
| 2010/0315230 | A1 * | 12/2010 | Kwon | ..................... G08B 25/10 340/540 |
| 2012/0327837 | A1 | 12/2012 | Harrington et al. | |
| 2014/0378089 | A1 | 12/2014 | Monros | |
| 2015/0201316 | A1 * | 7/2015 | Khatibi | ................... H04W 4/02 455/404.2 |
| 2016/0163174 | A1 | 6/2016 | Zhang | |
| 2016/0174054 | A1 | 6/2016 | Dunn et al. | |
| 2016/0335879 | A1 | 11/2016 | Carr | |
| 2018/0220269 | A1 * | 8/2018 | Katakam | ................. H04W 4/90 |

FOREIGN PATENT DOCUMENTS

WO   WO-2010123421 A1 * 10/2010 ............ H04W 76/50

* cited by examiner

*Primary Examiner* — Maharishi V Khirodhar
(74) *Attorney, Agent, or Firm* — BakerHostetler

(57) ABSTRACT

A device includes a first network connection for connecting to a wireless local area network, a processor communicatively coupled to the first network connection, and a display communicatively coupled to the processor. The device includes memory storing instructions that cause the processor to effectuate operations. The operations include receiving, via the first network connection, a WEA message comprising an alert and an indication of a geographic area associated with the alert and causing the display to render an alert indication based at least on the WEA message.

15 Claims, 10 Drawing Sheets

WI-FI COMMUNICATION OF WIRELESS EMERGENCY ALERTS

TECHNICAL FIELD

The technical field generally relates to wireless emergency alert (WEA) systems and, more specifically, to communicating WEA messages via Wi-Fi access points.

BACKGROUND

The WEA system is a public safety system that allows geographically targeted alerts to be communicated via mobile network connections to WEA-enabled devices. WEA messages may include AMBER alerts, weather-related alerts, or public safety emergencies, including but not limited to evacuation orders, shelter-in-place orders, or other alerts related to weather, terrorist threats, or environmental disasters.

WEA messages are sent through a mobile carrier. WEA alerts may be sent from public safety officials, such as through FEMA's Integrated Public Alert and Warning System (IPAS) to mobile carriers. In turn, these WEA messages may be broadcast from area cell towers to mobile devices connected to that cell tower. The mobile devices may then display the WEA message for the user.

The WEA system may suffer from one or more disadvantages or shortcomings. For example, receipt of a WEA message depends upon that device being connected to a mobile network. The device has to be WEA-enabled. Further, the precision at which the geographic area in which the alert is to be broadcast is limited.

This disclosure is directed to solving one of these or other problems.

SUMMARY

Disclosed herein are systems, methods, and apparatuses that assist in providing WEA messages via a wireless access point of a Wi-Fi network.

In an aspect, this disclosure is directed to a device comprising a first network connection for connecting to a wireless local area network (WLAN). The device may also include a processor communicatively coupled to the first network connection and a display communicatively coupled to the processor. The device may also include memory storing instructions that cause the processor to effectuate operations. The operations may include receiving, via the first network connection, a WEA message comprising an alert and an indication of a geographic area associated with the alert and causing the display to render an alert indication based at least on the WEA message.

In another aspect, this disclosure is directed to a WLAN access point. The WLAN access point may comprise a network connection for connecting to an Internet and a processor communicatively coupled to the network connection. The WLAN access point may also comprise a plurality of device connections for connecting a plurality of devices to the Internet. The plurality of device connections may be communicatively coupled to the processor. The WLAN access point may also comprise memory storing instructions that cause the processor to effectuate operations. The operations may include receiving, via the network connection, a message and an indication of a geographic area in which the message is to be communicated. The operations may include determining that a location of the WLAN access point is located within the geographic area and communicating an indication of the message to the plurality of devices via the plurality of device connections.

According to yet another aspect, this disclosure is directed to a method. The method may include receiving, at an access point of a WLAN, a WEA message comprising an alert and an indication of a geographic area in which the alert is to be communicated. The method may also include comparing, by the access point, an access point location of the wireless access point to the geographic area and, based on the comparing, confirming that the access point location is within the geographic area. The method may also include relaying the alert by the access point to a plurality of devices connected to the WLAN via the wireless access point.

BRIEF DESCRIPTION OF THE DRAWINGS

Aspects of the herein described WEA communications systems and methods are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers may refer to like elements throughout the application.

DETAILED DESCRIPTION

Figure 1:
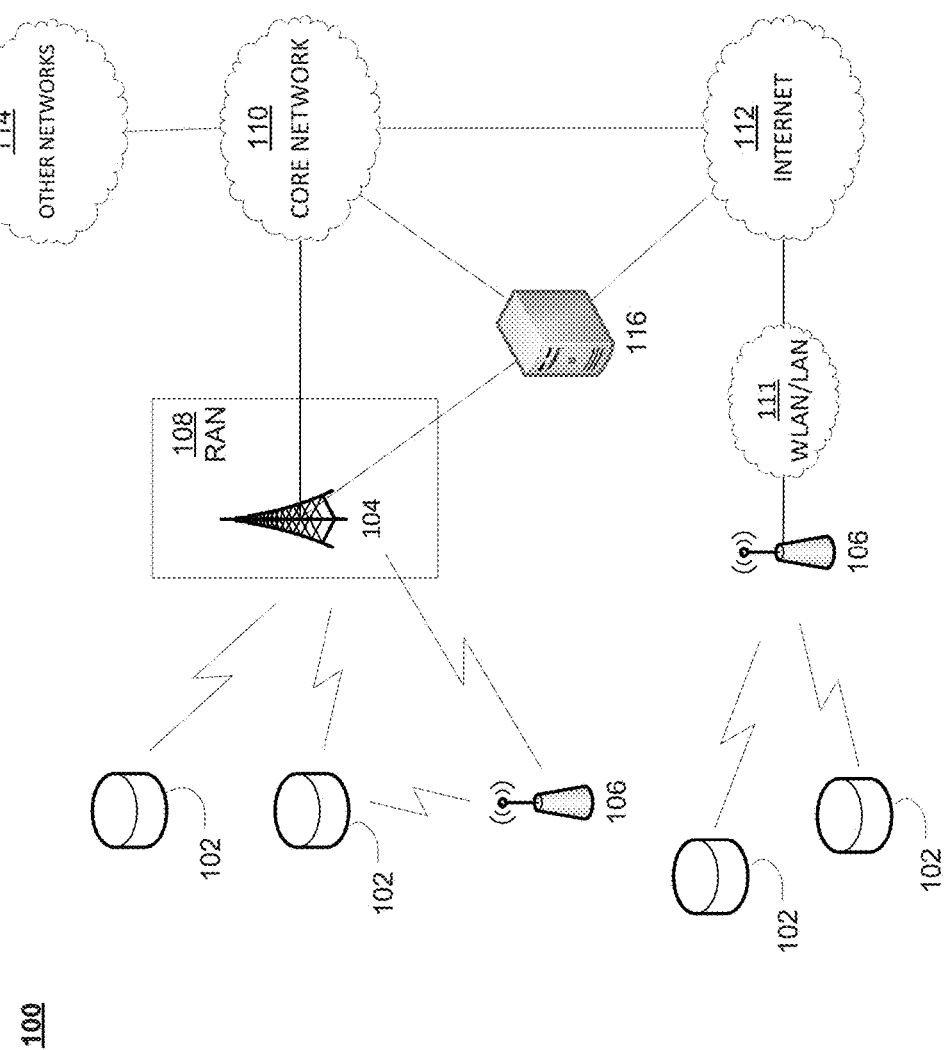
FIG. 1 illustrates an exemplary system for communicating WEA messages.

FIG. 1 illustrates a telecommunication system in which one or more devices 102, such as wireless transmit/receive units (WTRUs) or other network-connectable devices, may communicate via one or more access points, such as wireless access points 106 and base stations 104, to one or more networks. For example, devices 102 may include one or more end user devices, such as personal computers, tablets, smart phones, or other mobile devices; physical devices, like lighting equipment, televisions, home appliances, or the like; sensors or sensor-equipped systems, including health monitors, biometric sensors, sensors that track statistics on objects, environments, or other things; vehicles, including manned and unmanned vehicles, whether or not autonomous, robotic devices, machinery, and the like. Devices 102 may include other network-connected devices, including servers and backend systems. Devices 102 may include Internet of things (IoT) devices and devices that may communicate with IoT devices. Devices 102 may include devices that communicate through networks or technology other than cellular networks, such as those having 802.11XX connectivity.

Each of base stations 104 may be any type of device configured to wirelessly interface with at least one device 102 to facilitate access to or communication with network 118. By way of example, base stations 104 may be a base transceiver station (BTS), a Node-B, an eNode B, a Home Node B, a Home eNode B, a site controller, an access point (AP), a wireless router, or the like. While base stations 104 are each depicted as a single element, it will be appreciated that base stations 104 may include any number of interconnected base stations or network elements.

Each of wireless access points 106 may be any type of device configured to wirelessly interface with at least one device 102 to facilitate access or communication with one or more networks through an internet service protocol. For example, wireless access point 108 using a wireless protocol such as Bluetooth, Zigby, WiGig, or one or more of the variants of the IEEE 802.11 protocol. For example, wireless access point 106 may include a Wi-Fi hotspot, a router, or the like.

Telecommunication system 100 may include one or more networks, such as a radio access network (RAN) 108, a core network 110, a wireless local area network (WLAN) 111, the Internet 112, or other networks 114. The disclosed examples contemplate any number of devices 102, base stations 104, wireless access points 106, networks, or network elements.

RAN 108 may include one or more base stations 104, along with other network elements (not shown), such as a base station controller (BSC), a radio network controller (RNC), or relay nodes. One or more base stations 104 may be configured to transmit or receive wireless signals within a particular geographic region, which may be referred to as a cell (not shown). The cell may further be divided into cell sectors. For example, the cell associated with base station 104 may be divided into three sectors such that base station 104 may include three transceivers: one for each sector of the cell. In another example, base station 104 may employ multiple-input multiple-output (MIMO) technology and, therefore, may utilize multiple transceivers for each sector of the cell.

Base stations 104 may communicate with one or more of devices 102 over an air interface, which may be any suitable wireless communication link (e.g., radio frequency (RF), microwave, infrared (IR), ultraviolet (UV), or visible light). The air interface may be established using any suitable radio access technology (RAT).

More specifically, as noted above, telecommunication system 100 may be a multiple access system and may employ one or more channel access schemes, such as CDMA, TDMA, FDMA, OFDMA, SC-FDMA, or the like. For example, base station 104 in RAN 108 and devices 102 connected to RAN 108 may implement a radio technology such as Universal Mobile Telecommunications System (UMTS) Terrestrial Radio Access (UTRA) that may establish air interface using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example, base station 104 and devices 102 that are connected to RAN 108 may implement a radio technology such as Evolved UMTS Terrestrial Radio Access (E-UTRA), which may establish communication using LTE or LTE-Advanced (LTE-A).

Optionally base station 104 and devices 102 connected to RAN 108 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 104 may be a wireless router, Home Node B, Home eNode B, or access point, for example, and may utilize any suitable RAT for facilitating wireless connectivity in a localized area, such as a place of business, a home, a vehicle, a campus, or the like. For example, base station 104 and associated devices 102 may implement a radio technology such as IEEE 602.11 to establish a wireless local area network (WLAN). As another example, base station 104 and associated devices 102 may implement a radio technology such as IEEE 602.15 to establish a wireless personal area network (WPAN). In yet another example, base station 104 and associated devices 102 may utilize a cellular-based RAT (e.g., WCDMA, CDMA2000, GSM, LTE, LTE-A, etc.) to establish a picocell or femtocell.

RAN 108 may be in communication with core network 110, which may be any type of network configured to provide voice, data, applications, or voice over internet protocol (VoIP) services to one or more devices 102. For example, core network 110 may provide call control, billing services, mobile location-based services, pre-paid calling, Internet connectivity, video distribution or high-level security functions, such as user authentication. Although not shown in FIG. 1, it will be appreciated that RAN 108 or core network 110 may be in direct or indirect communication with other RANs that employ the same RAT as RAN 108 or a different RAT. For example, in addition to being connected to RAN 108, which may be utilizing an E-UTRA radio technology, core network 110 may also be in communication with another RAN (not shown) employing a GSM radio technology.

Core network 110 may also serve as a gateway for devices 102 to access Internet 112 or other networks 114. Internet 112 may include a global system of interconnected computer networks or devices that use common communication protocols, such as TCP, user datagram protocol (UDP), or IP in the TCP/IP internet protocol suite. Other networks 114 may include wired or wireless communications networks owned or operated by service providers that differ from the service provider that owns or operates core network 110. For example, other networks 114 may include another core network connected to one or more RANs, which may employ the same RAT as RAN 108 or a different RAT.

Some or all devices 102 in telecommunication system 100 may include multi-mode capabilities. That is, devices 102 may include multiple transceivers for communicating with different wireless networks over different wireless links. For example, one or more devices 102 may be configured to communicate with base station 104, which may employ a cellular-based radio technology, and with access point 106, which may employ an IEEE 802 radio technology.

Telecommunication system 100 may include functionality for communicating WEA messages. For example, telecommunication system 100 may include an alert server 116. In an aspect, alert server 116 may comprise a part of or be in communication with a centralized warning system, such as Integrated Public Alert and Warning System (IPAWS). Alert server 116 may comprise any appropriate type of equipment, such as, for example, a computer, a server, a mobile device, a tablet, or any type of equipment capable of receiving and processing WEAs to facilitate relaying WEAs through telecommunication system 100 to devices 102. In an aspect, alert server 116 may comprise or be in communication with core network 110. For example, alert server 116 may be controlled by the service provider or network operator of core network 110. Alert server 116 may receive the WEA from a WEA originator, such a federal, state, or local government entity.

Figure 2:
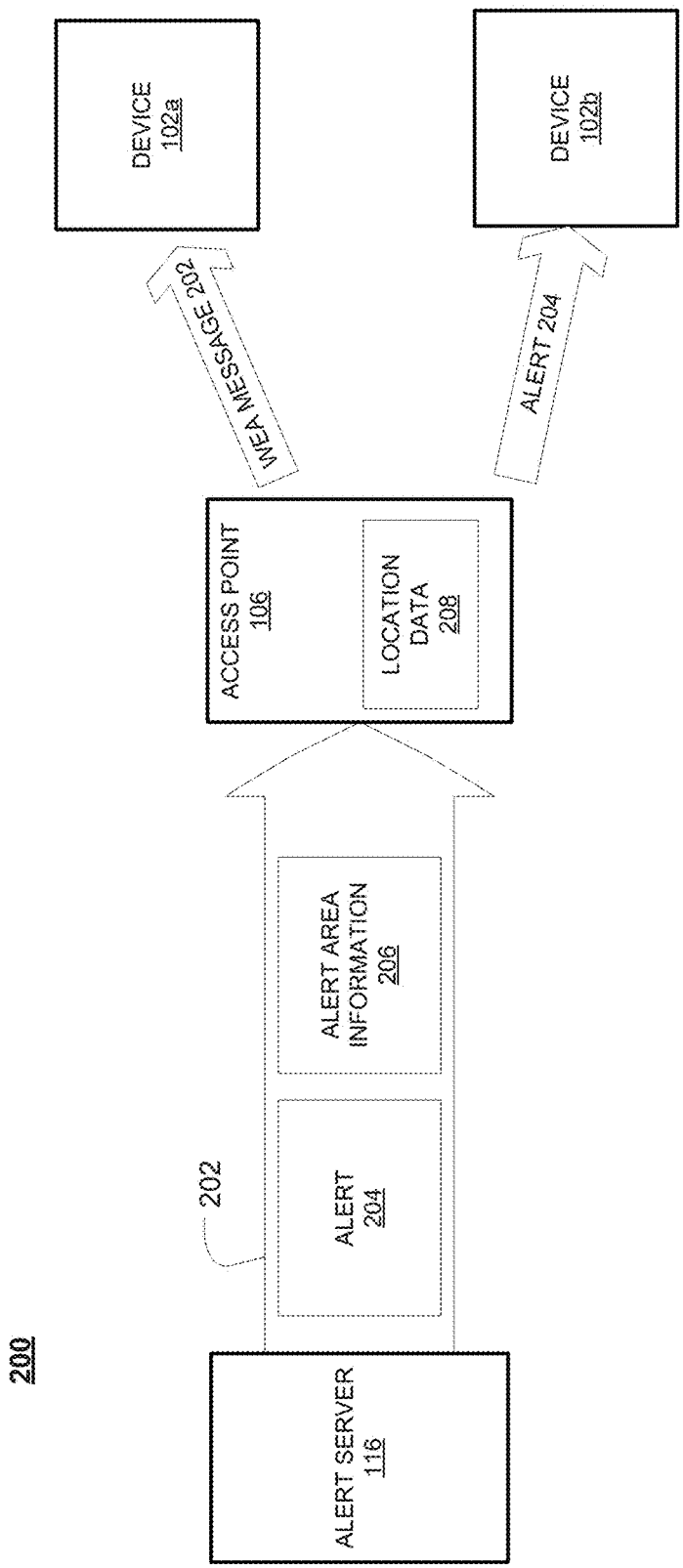
FIG. 2 illustrates an exemplary data flow in accordance with an aspect of this disclosure.

FIG. 2 is a diagram of data flow 200 that may be used within telecommunication system 100 for communicating WEAs to devices 102 through wireless access point 106. Alert server 116 may communicate a WEA message 202 to a wireless access point 106, such as through RAN 108, core network 110, or Internet 112. WEA message 202 may include the WEA (e.g. alert 204), as well as an indication of the geographic area in which alert 204 is to be communicated (e.g., alert area information 206).

Wireless access point 106 may have access to location data 208 that indicates a geographic location of wireless access point 106. Optionally, wireless access point 106 may compare alert area information 206 to network location data 208 to determine whether wireless access point 106 is located within (or within a range of) alert area information 206. For example, wireless access point 106 may use this preliminary check as a requirement to be met before wireless access point transmits or communicates any portion of WEA message 202 to devices 102 connected to wireless access point 106.

Wireless access point 106 may communicate at least a portion of WEA message 202 to one or more devices 102 connected to wireless access point 106. For example, wireless access point 106 may communicate alert 204 to device 102*b*. Additionally or alternatively, wireless access point 106 may communicate alert area information 206. For example, wireless access point 106 may communicate WEA message 202—including alert area information 206—to device 102*a*.

Wireless access point 106 may communicate alert 204 to devices 102 that are connected to wireless access point 106. Optionally, this communication may include providing alert area information 206 to devices 102. This may be done so that, optionally, devices 102 can determine whether to display alert 205 based on whether the location information of device 102 is within (or within a range of) the geographic area indicated by alert area information 206. For example, FIG. 2 illustrates device 102*a* receiving both alert 204 and alert area information 206. Additionally or alternatively, wireless access point 106 may communicate alert 204— without alert area information 206—as illustrated by the communication to device 102*b*.

Once device 102 receives WEA message 202 or alert 204, device 102 may cause all or a portion of WEA message 202 or alert 204 to be displayed. For example, device 102 may display alert 204. Optionally, device 102 may determine whether device 102 is located within the alert area prior to displaying alert 204. For example, device 102*a* may compare alert area information 206 received in WEA message 202 to its own location information. For example, device 102*a* may optionally not display alert 204 based on its location being outside of the area indicated by alert area information 206.

Figure 3:
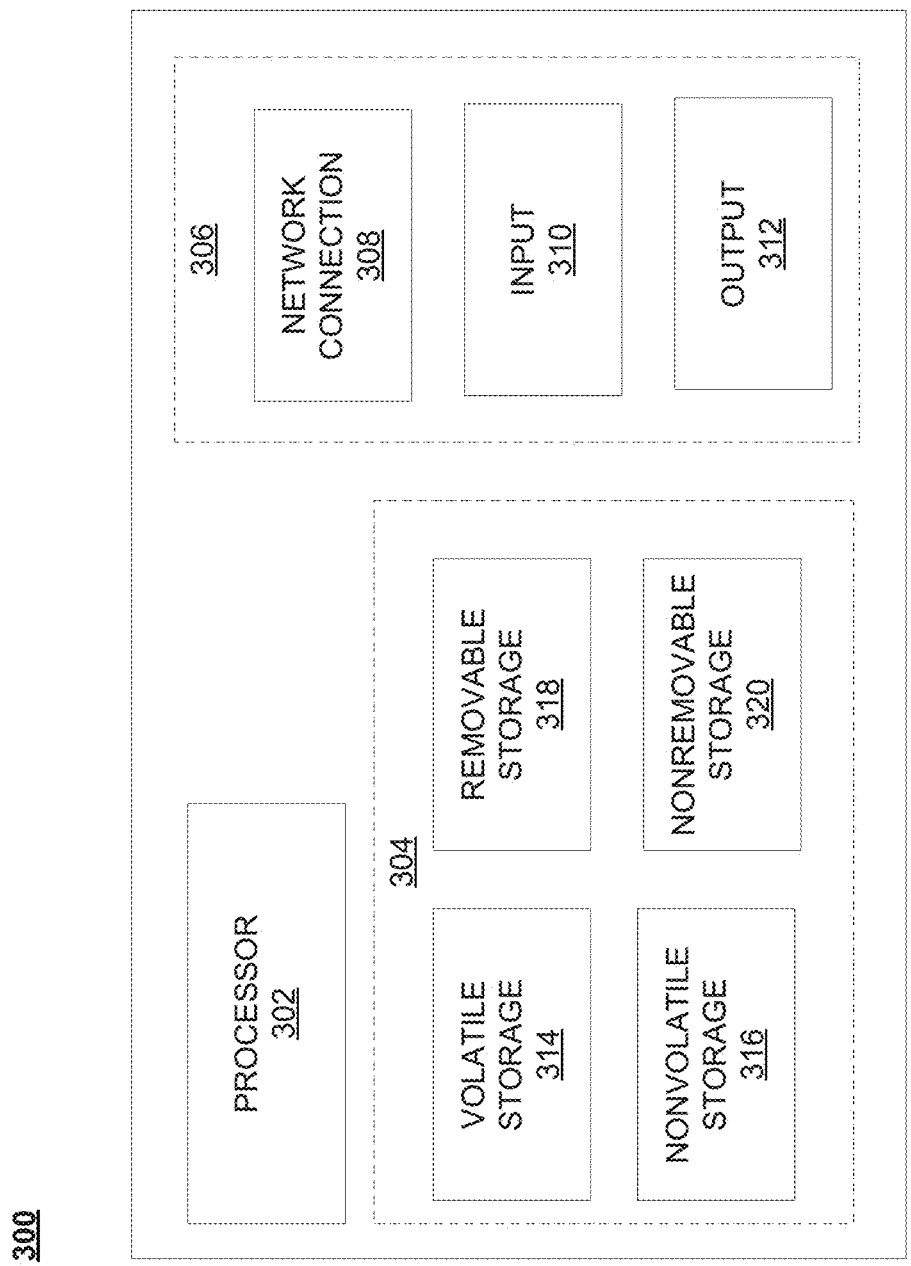
FIG. 3 is a schematic of an exemplary network device.

FIG. 3 is a block diagram of a network device 300 that may be connected to or comprise a component of telecommunication system 100. For example, one or more of devices 102, access points 106, or alert server 116 may comprise all or a portion of network device 300. Network device 300 may comprise hardware or a combination of hardware and software.

The functionality to facilitate telecommunications via a telecommunications network may reside in one or a combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications therebetween. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 may also contain one or more network connections 308 that allows network device 300 to facilitate communications between devices 102 and networks, such as WLAN 111 or Internet 112. Network connections 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 for receiving user inputs, such as keyboard, mouse, pen, voice input device, or touch input device. Input/output system 306 may also include an output device 310, such as a display, speakers, vibration outputs, or a printer.

For example, device 102 or access point 106 may comprise network device 300 in which input/output system 306 may include an IEEE 802.11-compliant transceiver. Optionally, input/output system 306 of device 102 or access point 106 may also include a transceiver for communicating with a cellular network, such as core network 110, through one or more RANs 108. Further, input/output system 306 of access point 106 may include one or more network connections for connecting other devices 106 to a network, such as Internet 112.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to communicate alerts, such as WEA messages 202.

Figure 4:
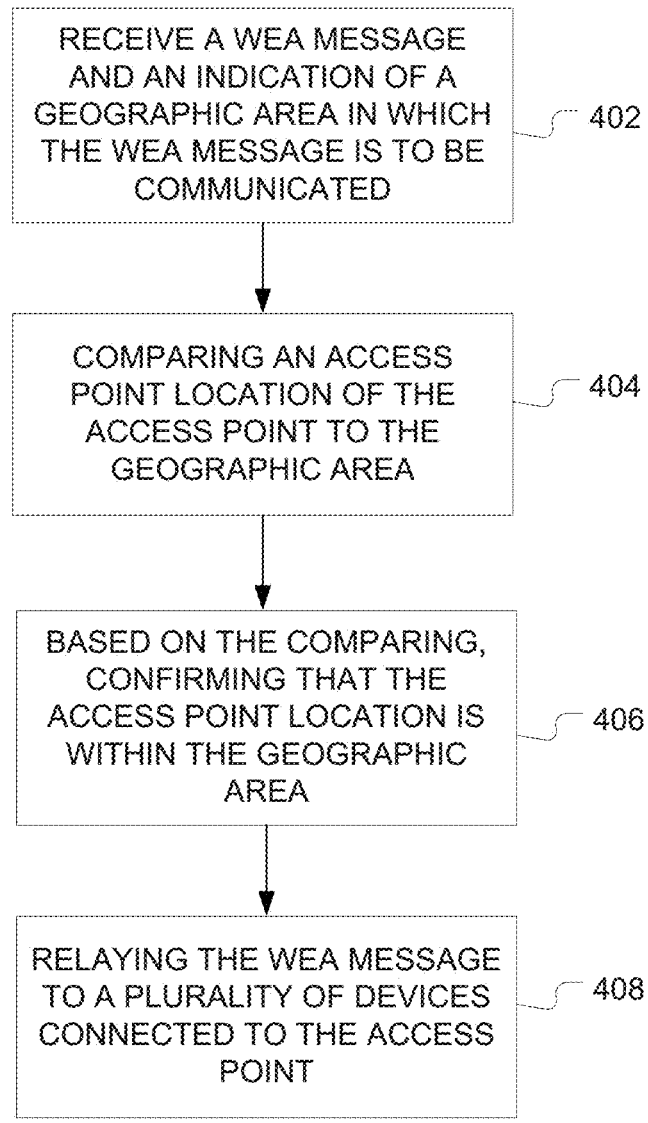
FIG. 4 is a flowchart of an exemplary method for communicating alert messages.

FIG. 4 discloses a method 400 that may be performed by a network device 300, such as access point 106. At step 402, method 400 may include receiving, at access point 106 of WLAN 111, WEA message 202, which may include alert 204, and an alert area information 206 (e.g., an indication of a geographic area in which the WEA message is to be communicated). In an aspect, access point 106 may receive WEA message 202 via WLAN 111. Additionally or alternatively, access point 106 may receive WEA message 202 through another network connection, such as via core network 110.

For example, alert 204 may comprise information or content that is intended to be relayed to persons within the geographic area. Alert 204 may include a message from a local, state, or federal government entity. For example, alert 204 may comprise an AMBER alert or a SILVER alert. Alert 204 may related to weather conditions, such as a tornado warning, a hurricane warning, or information regarding a recommended or required response to the weather condition, such as a command to evacuate, an evacuation route, or a take cover warning. Alert 204 may relate to other conditions, such as a terrorist attack, compromised water, or power outages.

Alert area information 206 may indicate a geographic area by one or more methods. For example, alert area information 206 may include a geographic location. For example, alert area information 206 may identify the geographic location by one or more landmarks, such as an address, latitude-longitude coordinates, or the like. For example, alert area information 206 may define a geographic area by that area contained within a plurality of latitude-longitude coordinates. Additionally or alternatively, alert area information 206 may include latitude-longitude coordinates and a radius, such that the geographic area includes all locations within the radius of the latitude-longitude coordinates. Additionally or alternatively, the geographic location may be identified by one or more geographic boundaries, such as zip codes, county lines, city lines, state lines, or the like.

At step 404, method 400 may include comparing, by the access point, an access point location of the access point to the geographic area. In an aspect, access point 106 may have access to data indicating its location (e.g., the access point location). For example, this information may comprise GPS data, or the like. As another example, access point location may be derived or indicated by user input data or a relative location of access point 106 to other known locations, such as the locations of other access points 106, or the like.

At step 406, method 400 may include, based on the comparing, confirming that the access point location is within the geographic area. In an aspect, access point 106 may only relay alert 204 if the access point location is within (or within a range of) the geographic area. Thus, this confirming may be a threshold requirement for relaying alert 204.

At step 408, method 400 may include relaying alert 204 by access point 106 to a plurality of devices 102 connected WLAN 111 via access point 106. For example, access point 106 may relay alert 204 via WLAN 111. Relaying alert 204 may comprise using one or more wireless protocols, such as IEEE 802.11 protocols.

Optionally, relaying alert 204 may also comprise relaying alert area information 206. For example, this information may be used by device 102 as a check to confirm that device 102 is within the geographic area. Device 102 may use similar or different methods for determining whether it is located within the geographic area. For example, device 102 may estimate or determine its location based on GPS data or the like. In this case, relaying alert 204 by access point 106 may cause device 102 to confirm that its location is within the geographic area. This may be done, for example, as a prerequisite for displaying alert 204 on device 102.

If the comparing at step 404 indicates that access point 106 is not within (or within a range of) geographic area, access point 106 may ignore alert 204. That is, access point 106 may not relay alert 204 to devices 102 connected to access point 106. In an aspect, access point 106 may receive WEA message 202 as a result of one or more databases storing a location of access point 106. In an aspect, if access point 106 receives WEA message 202 for a geographic area that does not include access point 106, access point 106 may communicate its access point location to such a database (e.g., part of alert server 116). In this case, access point location data associated with that access point 106 may be updated. This may prevent access point 106 from receiving future WEA messages 202 for geographic areas in which access point 106 is not located.

Figure 5:
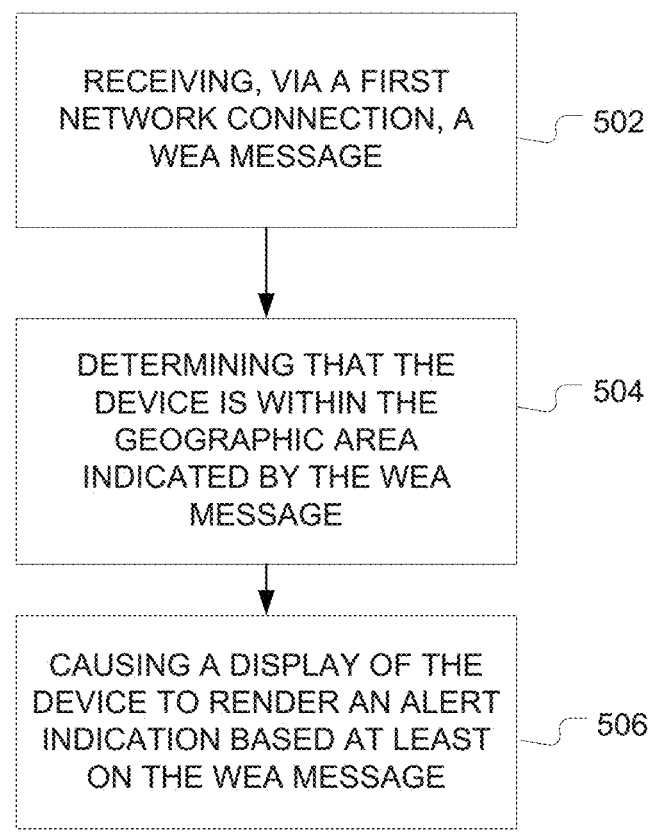
FIG. 5 is a flowchart of an exemplary method for communicating alert messages.

The flowchart of FIG. 5 illustrates an exemplary method 500 that may be performed by a device 102. In an aspect, as discussed above, device 102 may have multiple network connections. For example, device 102, such as a mobile device, may comprise a first network connection 308 for connecting to WLAN 111. For example, first network connection 308 may comprise hardware and software for 802.11 wireless communications, Bluetooth® communications, or near-field communications. As another example, device 102, such a mobile device, may comprise a second network connection 308 for connecting to core network 110, such as hardware and software for LTE, TD-LTE, TD-SCDMA 1900, UMTS/HSPA+/DC-HSDPA, CDMA EV-DO, GSM/EDGE, or similar communications.

At step 505, device 102 may receive, via first connection 308, WEA message 202. For example, alert 204 may comprise information or content that is intended to be relayed to persons within the geographic area. Alert 204 may include a message from a local, state, or federal government entity. For example, alert 204 may comprise an AMBER alert or a SILVER alert. Alert 204 may related to weather conditions, such as a tornado warning, a hurricane warning, or information regarding a recommended or required response to the weather condition, such as a command to evacuate, an evacuation route, or a take cover warning. Alert 204 may relate to other conditions, such as a terrorist attack, compromised water, or power outages.

Alert area information 206 may indicate a geographic area by one or more methods. For example, alert area information 206 may include a geographic location. For example, alert area information 206 may identify the geographic location by one or more landmarks, such as an address, latitude-longitude coordinates, or the like. For example, alert area information 206 may define a geographic area by that area contained within a plurality of latitude-longitude coordinates. Additionally or alternatively, alert area information 206 may include latitude-longitude coordinates and a radius, such that the geographic area includes all locations within the radius of the latitude-longitude coordinates. Additionally or alternatively, the geographic location may be identified by one or more geographic boundaries, such as zip codes, county lines, city lines, state lines, or the like.

Optionally, method 500 may include, at step 504, determining that a location of device 102 is within the geographic area indicated by WEA message 202. For example, step 504 may be a prerequisite for displaying alert 204.

At step 506, method 500 may include causing display (such as output 310) to render an alert indication based on at least WEA message 202. For example, the alert indication may identify content of alert 204. Additionally or alternatively, the alert indication may also identify the geographic area.

Device 102 may include functionality for disregarding or not displaying alerts 204 associated with geographic areas that do not include the location of device 102. For example, the operations of device 102 may include receiving, via first network connection 308, second WEA message 202, which may comprise second alert 204 and a second indication of a geographic area. The operations may include determining that the location of device 102 is outside the geographic area indicated by second WEA message 202. Based on the location being outside of the geographic area, the operations may include not displaying an indication of alert 204 of second WEA message 202.

As device 102 includes two network connections 308 through which WEA messages 202 may be received, device 102 may be equipped with functionality to filter multiple WEA messages 202, such as messages received through first and second network connections 308, to avoid redundant displays of the same alert 204. For example, device 102 may receive a second WEA message 202 via second network connection 308. This may be, for example, WEA message 202 transmitted via core network 110. In an aspect, second WEA message 202 may be similar to or the same as WEA message 202 received via first network connection 308. To avoid redundant displays of alert indications, the operations may include comparing alert 202 to second alert 202, or a content of WEA message 202 to a content of second WEA message 202. Based on the comparing, the operations may include determining that both WEA messages 202 relate to the same event. This may be based on a message identifier of each WEA message 202 being the same, content of each WEA message 202 having a similarity level. Additionally or alternatively, determining that two WEA messages 202 relate to a common event may be based on geographic area information 206 being the same or overlapping. Whether WEA messages 202 relate to a common event may also be at least partially based on the temporal relationship between two WEA messages 202, such as when two WEA messages 202 are received within a common time frame, such as within 10 minutes of each other.

When two WEA messages 202 relate to a common event, the alert indication displayed by device 102 may be based on both WEA messages 202. Additionally or alternatively, device 102 may decline to display an indication of a later received WEA message 202 based on an earlier displayed alert indication already providing, to a user, the information of alert 204.

This comparison may also result in determining that two WEA messages 202 relate to different events, and thus, displaying a second indication based on second WEA message 202.

Figure 6:
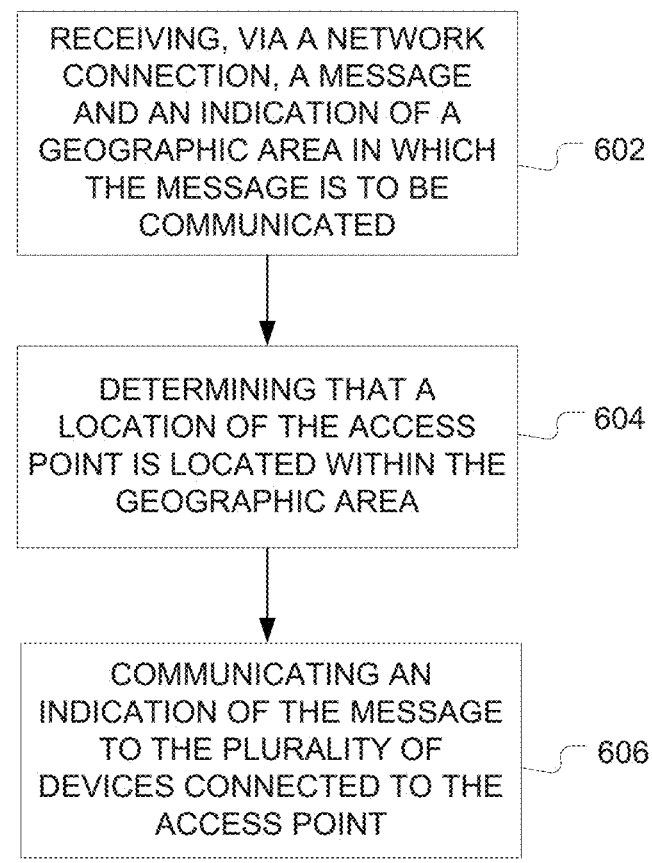
FIG. 6 is a flowchart of an exemplary method for communicating alert messages.

The flowchart of FIG. 6 illustrates an exemplary method 600 that may be performed by access point 106, such as a WLAN access point. As discussed above, access point 106 may comprise a network connection for connecting to an external network, such as Internet 112. Access point 106 may also comprise a plurality of device connections for connecting a plurality of devices 102 to Internet 112, such as through WLAN 111. For example, the plurality of device connections may comprise a plurality of access antennas. For example, WLAN access point 106 may comprise a wireless router.

At step 602, access point 106 may receive, via network connection 308, a message and an indication of a geographic area in which the message is to be communicated. For example, the message may comprise WEA message 202. Access point 106 may receive WEA message 202 from emergency alert server 116, which may be associated with a cellular network provider.

At step 604, access point 106 may determine that its location is located within the geographic area indicated by the message. This may be a prerequisite for relaying the message. For example, if, at step 604, it is determined that access point 106 is not located within the geographic area, access point 106 may not communicate an indication of the message associated with the geographic area.

Based on determining that access point 106 is located within the geographic area, access point 106 at step 606 may communicate an indication of the message (e.g., WEA message 202) to the plurality of devices 102 via the plurality of device connections. Optionally, this may include communicating an indication of the geographic area. Receipt of this communication from access point 106 may cause the plurality of devices 102 to display an indication of the message.

Figure 7:
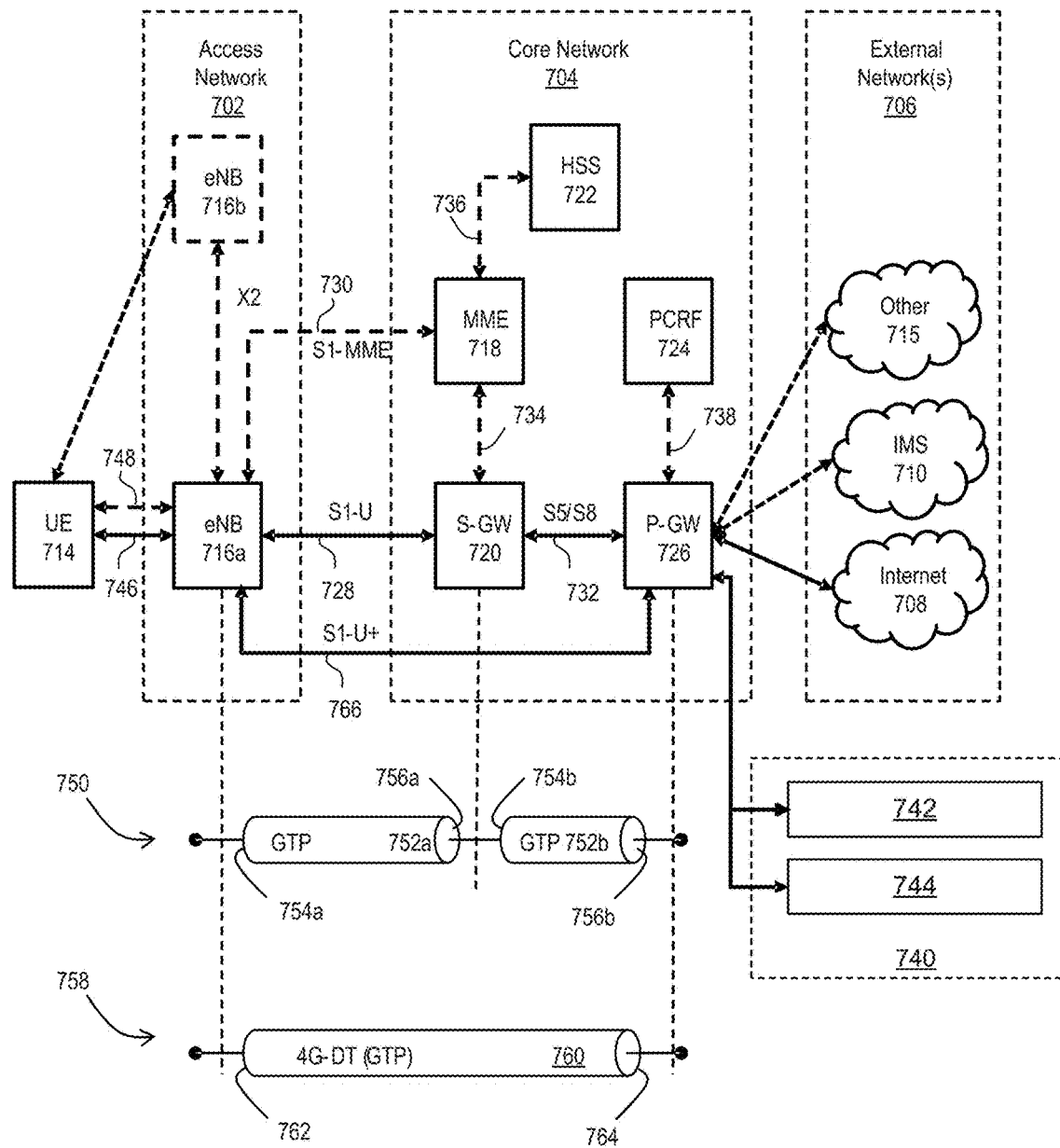
FIG. 7 is an exemplary network architecture.

FIG. 7 illustrates a functional block diagram depicting one example of an LTE-EPS network architecture 700 related to the current disclosure. In particular, the network architecture 700 disclosed herein is referred to as a modified LTE-EPS architecture 700 to distinguish it from a traditional LTE-EPS architecture.

An example modified LTE-EPS architecture 700 is based at least in part on standards developed by the 3rd Generation Partnership Project (3GPP), with information available at www.3gpp.org. In one embodiment, the LTE-EPS network architecture 700 includes an access network 702, a core network 704, e.g., an EPC or Common BackBone (CBB) and one or more external networks 706, sometimes referred to as PDN or peer entities. Different external networks 706 can be distinguished from each other by a respective network identifier, e.g., a label according to DNS naming conventions describing an access point to the PDN. Such labels can be referred to as Access Point Names (APN). External networks 706 can include one or more trusted and non-trusted external networks such as an internet protocol (IP) network 708, an IP multimedia subsystem (IMS) network 710, and other networks 712, such as a service network, a corporate network, or the like. Network 104 may include one or more access networks 702, core networks 704, or an external networks 706.

Access network 702 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 702 can include one or more communication devices, commonly referred to as UE 714, and one or more wireless access nodes, or base stations 716a, 716b. During network operations, at least one base station 716 communicates directly with UE 714. Base station 716 can be an evolved Node B (e-NodeB), with which UE 714 communicates over the air and wirelessly. UEs 714 can include, without limitation, wireless devices, e.g., satellite communication systems, portable digital assistants (PDAs), laptop computers, tablet devices and other mobile devices (e.g., cellular telephones, smart appliances, and so on). UEs 714 can connect to eNBs 716 when UE 714 is within range according to a corresponding wireless communication technology.

UE 714 generally runs one or more applications that engage in a transfer of packets between UE 714 and one or more external networks 706. Such packet transfers can include one of downlink packet transfers from external network 706 to UE 714, uplink packet transfers from UE 714 to external network 706 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 704, e.g., according to parameters, such as the QoS.

Core network 704 uses a concept of bearers, e.g., EPS bearers, to route packets, e.g., IP traffic, between a particular gateway in core network 704 and UE 714. A bearer refers generally to an IP packet flow with a defined QoS between the particular gateway and UE 714. Access network 702, e.g., E UTRAN, and core network 704 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 704 includes various network entities, such as MME 718, SGW 720, Home Subscriber Server (HSS) 722, Policy and Charging Rules Function (PCRF) 724 and PGW 726. In one embodiment, MME 718 comprises a control node performing a control signaling between various equipment and devices in access network 702 and core network 704. The protocols running between UE 714 and core network 704 are generally known as Non-Access Stratum (NAS) protocols.

For illustration purposes only, the terms MME 718, SGW 720, HSS 722 and PGW 726, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 720 routes and forwards all user data packets. SGW 720 also acts as a mobility anchor for user plane operation during handovers between base stations, e.g., during a handover from first eNB 716a to second eNB 716b as may be the result of UE 714 moving from one area of coverage, e.g., cell, to another. SGW 720 can also terminate a downlink data path, e.g., from external network 706 to UE 714 in an idle state, and trigger a paging operation when downlink data arrives for UE 714. SGW 720 can also be configured to manage and store a context for UE 714, e.g., including one or more of parameters of the IP bearer service and network internal routing information. In addition, SGW 720 can perform administrative functions, e.g., in a visited network, such as collecting information for charging (e.g., the volume of data sent to or received from the user), or replicate user traffic, e.g., to support a lawful interception. SGW 720 also serves as the mobility anchor for interworking with other 3GPP technologies such as universal mobile telecommunication system (UMTS).

At any given time, UE 714 is generally in one of three different states: detached, idle, or active. The detached state is typically a transitory state in which UE 714 is powered on but is engaged in a process of searching and registering with network 702. In the active state, UE 714 is registered with access network 702 and has established a wireless connection, e.g., radio resource control (RRC) connection, with eNB 716. Whether UE 714 is in an active state can depend on the state of a packet data session, and whether there is an active packet data session. In the idle state, UE 714 is generally in a power conservation state in which UE 714 typically does not communicate packets. When UE 714 is idle, SGW 720 can terminate a downlink data path, e.g., from one peer entity 406, and triggers paging of UE 714 when data arrives for UE 714. If UE 714 responds to the page, SGW 720 can forward the IP packet to eNB 716a.

HSS 722 can manage subscription-related information for a user of UE 714. For example, tHSS 722 can store information such as authorization of the user, security requirements for the user, quality of service (QoS) requirements for the user, etc. HSS 722 can also hold information about external networks 706 to which the user can connect, e.g., in the form of an APN of external networks 706. For example, MME 718 can communicate with HSS 722 to determine if UE 714 is authorized to establish a call, e.g., a voice over IP (VoIP) call before the call is established.

PCRF 724 can perform QoS management functions and policy control. PCRF 724 is responsible for policy control decision-making, as well as for controlling the flow-based charging functionalities in a policy control enforcement function (PCEF), which resides in PGW 726. PCRF 724 provides the QoS authorization, e.g., QoS class identifier and bit rates that decide how a certain data flow will be treated in the PCEF and ensures that this is in accordance with the user's subscription profile.

PGW 726 can provide connectivity between the UE 714 and one or more of the external networks 706. In illustrative network architecture 700, PGW 726 can be responsible for IP address allocation for UE 714, as well as one or more of QoS enforcement and flow-based charging, e.g., according to rules from the PCRF 724. PGW 726 is also typically responsible for filtering downlink user IP packets into the different QoS-based bearers. In at least some embodiments, such filtering can be performed based on traffic flow templates. PGW 726 can also perform QoS enforcement, e.g., for guaranteed bit rate bearers. PGW 726 also serves as a mobility anchor for interworking with non-3GPP technologies such as CDMA2000.

Within access network 702 and core network 704 there may be various bearer paths/interfaces, e.g., represented by solid lines 728 and 730. Some of the bearer paths can be referred to by a specific label. For example, solid line 728 can be considered an S1-U bearer and solid line 732 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 704 can include various signaling bearer paths/interfaces, e.g., control plane paths/interfaces represented by dashed lines 730, 734, 736, and 738. Some of the signaling bearer paths may be referred to by a specific label. For example, dashed line 730 can be considered as an S1-MME signaling bearer, dashed line 734 can be considered as an S11 signaling bearer and dashed line 736 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 766. In the illustrative example, the S1-U+ user plane interface extends between the eNB 716a and PGW 726. Notably, S1-U+ path/interface does not include SGW 720, a node that is otherwise instrumental in configuring and/or managing packet forwarding between eNB 716a and one or more external networks 706 by way of PGW 726. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 720, 726 due to excessive handover events.

In some embodiments, PGW 726 is coupled to storage device 740, shown in phantom. Storage device 740 can be integral to one of the network nodes, such as PGW 726, for example, in the form of internal memory and/or disk drive. It is understood that storage device 740 can include registers suitable for storing address values. Alternatively or in addition, storage device 740 can be separate from PGW 726, for example, as an external hard drive, a flash drive, and/or network storage.

Storage device 740 selectively stores one or more values relevant to the forwarding of packet data. For example, storage device 740 can store identities and/or addresses of network entities, such as any of network nodes 718, 720, 722, 724, and 726, eNBs 716 and/or UE 714. In the illustrative example, storage device 740 includes a first storage location 742 and a second storage location 744. First storage location 442 can be dedicated to storing a Currently Used Downlink address value 742. Likewise, second storage location 744 can be dedicated to storing a Default Downlink Forwarding address value 444. PGW 726 can read and/or write values into either of storage locations 742, 744, for example, managing Currently Used Downlink Forwarding address value 742 and Default Downlink Forwarding address value 744 as disclosed herein.

In some embodiments, the Default Downlink Forwarding address for each EPS bearer is the SGW S5-U address for each EPS Bearer. The Currently Used Downlink Forwarding address" for each EPS bearer in PGW 726 can be set every time when PGW 726 receives an uplink packet, e.g., a GTP-U uplink packet, with a new source address for a corresponding EPS bearer. When UE 714 is in an idle state, the "Current Used Downlink Forwarding address" field for each EPS bearer of UE 714 can be set to a "null" or other suitable value.

In some embodiments, the Default Downlink Forwarding address is only updated when PGW 726 receives a new SGW S5-U address in a predetermined message or messages. For example, the Default Downlink Forwarding address is only updated when PGW 726 receives one of a Create Session Request, Modify Bearer Request and Create Bearer Response messages from SGW 720.

As values 742, 744 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 702 and core network 704 are illustrated in a simplified block diagram in FIG. 7. In other words, either or both of access network 702 and the core network 704 can include additional network elements that are not shown, such as various routers, switches and controllers. In addition, although FIG. 7 illustrates only a single one of each of the various network elements, it should be noted that access network 702 and core network 704 can include any number of the various network elements. For example, core network 704 can include a pool (i.e., more than one) of MMEs 718, SGWs 720 or PGWs 726.

In the illustrative example, data traversing a network path between UE 714, eNB 716*a*, SGW 720, PGW 726 and external network 706 may be considered to constitute data transferred according to an end-to-end IP service. However, for the present disclosure, to properly perform establishment management in LTE-EPS network architecture 700, the core network, data bearer portion of the end-to-end IP service is analyzed.

An establishment may be defined herein as a connection set up request between any two elements within LTE-EPS network architecture 700. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 746) between UE 714 and eNB 716*a*, a second portion (e.g., an S1 data bearer 728) between eNB 716*a* and SGW 720, and a third portion (e.g., an S5/S8 bearer 732) between SGW 720 and PGW 726. Various signaling bearer portions are also illustrated in FIG. 7. For example, a first signaling portion (e.g., a signaling radio bearer 748) between UE 714 and eNB 716*a*, and a second signaling portion (e.g., S1 signaling bearer 730) between eNB 716*a* and MME 718.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 700, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 750 includes a first tunnel 752*a* between two tunnel endpoints 754*a* and 756*a*, and a second tunnel 752*b* between two tunnel endpoints 754*b* and 756*b*. In the illustrative example, first tunnel 752*a* is established between eNB 716*a* and SGW 720. Accordingly, first tunnel 752*a* includes a first tunnel endpoint 754*a* corresponding to an S1-U address of eNB 716*a* (referred to herein as the eNB S1-U address), and second tunnel endpoint 756*a* corresponding to an S1-U address of SGW 720 (referred to herein as the SGW S1-U address). Likewise, second tunnel 752*b* includes first tunnel endpoint 754*b* corresponding to an S5-U address of SGW 720 (referred to herein as the SGW S5-U address), and second tunnel endpoint 756*b* corresponding to an S5-U address of PGW 726 (referred to herein as the PGW S5-U address).

In at least some embodiments, first tunnel solution 750 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 758 includes a single or direct tunnel 760 between tunnel endpoints 762 and 764. In the illustrative example, direct tunnel 760 is established between eNB 716*a* and PGW 726, without subjecting packet transfers to processing related to SGW 720. Accordingly, direct tunnel 760 includes first tunnel endpoint 762 corresponding to the eNB S1-U address, and second tunnel endpoint 764 corresponding to the PGW S5-U address. Packet data received at either end can be encapsulated into a payload and directed to the corresponding address of the other end of the tunnel. Such direct tunneling avoids processing, e.g., by SGW 720 that would otherwise relay packets between the same two endpoints, e.g., according to a protocol, such as the GTP-U protocol.

In some scenarios, direct tunneling solution 758 can forward user plane data packets between eNB 716*a* and PGW 726, by way of SGW 720. That is, SGW 720 can serve a relay function, by relaying packets between two tunnel endpoints 716*a*, 726. In other scenarios, direct tunneling solution 758 can forward user data packets between eNB 716*a* and PGW 726, by way of the S1 U+ interface, thereby bypassing SGW 720.

Generally, UE 714 can have one or more bearers at any one time. The number and types of bearers can depend on applications, default requirements, and so on. It is understood that the techniques disclosed herein, including the configuration, management and use of various tunnel solutions 750, 758, can be applied to the bearers on an individual bases. That is, if user data packets of one bearer, say a bearer associated with a VoIP service of UE 714, then the forwarding of all packets of that bearer are handled in a similar manner. Continuing with this example, the same UE 714 can have another bearer associated with it through the same eNB 716*a*. This other bearer, for example, can be associated with a relatively low rate data session forwarding user data packets through core network 704 simultaneously with the first bearer. Likewise, the user data packets of the other bearer are also handled in a similar manner, without necessarily following a forwarding path or solution of the first bearer. Thus, one of the bearers may be forwarded through direct tunnel 758; whereas, another one of the bearers may be forwarded through a two-tunnel solution 750.

Figure 8:
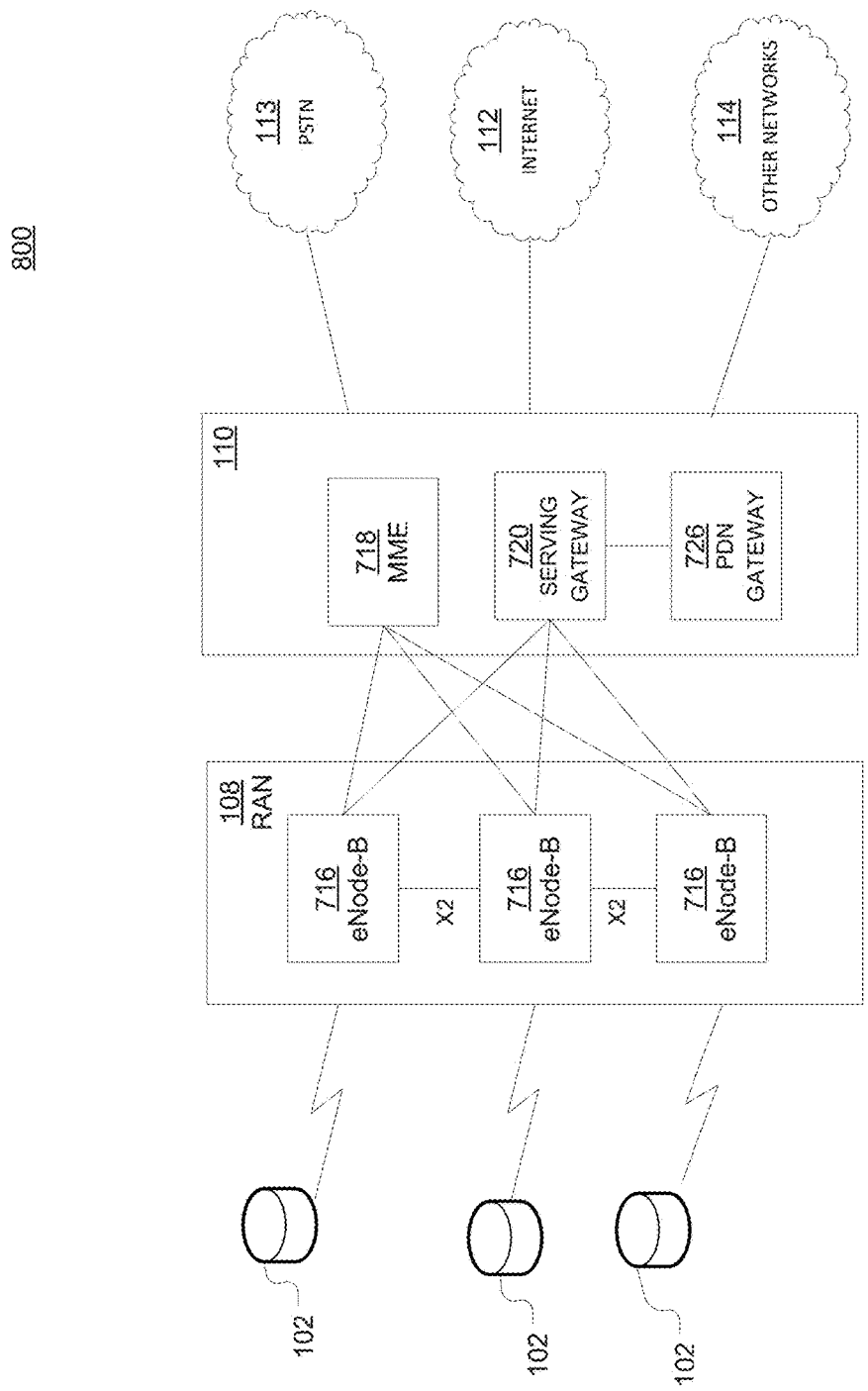
FIG. 8 depicts an overall block diagram of an example packet-based mobile cellular network environment.

FIG. 8 is an example system 800 including RAN 108 and core network 110. As noted above, RAN 108 may employ an E-UTRA radio technology to communicate with devices 102 over air interface. RAN 108 may also be in communication with core network 110.

RAN 108 may include any number of eNode-Bs 716 while remaining consistent with the disclosed technology. One or more eNode-Bs 716 may include one or more transceivers for communicating with the devices 102 over air interface. Optionally, eNode-Bs 716 may implement MIMO technology. Thus, one of eNode-Bs 716, for example, may use multiple antennas to transmit wireless signals to, or receive wireless signals from, one of Devices 102.

Each of eNode-Bs 716 may be associated with a particular cell (not shown) and may be configured to handle radio resource management decisions, handover decisions, scheduling of users in the uplink or downlink, or the like. As shown in FIG. 7 eNode-Bs 716 may communicate with one another over an X2 interface.

Core network 110 shown in FIG. 7 may include a mobility management gateway or entity (MME) 718, a serving gateway 706, or a packet data network (PDN) gateway 726. While each of the foregoing elements are depicted as part of core network 110, it will be appreciated that any one of these elements may be owned or operated by an entity other than the core network operator.

MME 718 may be connected to each of eNode-Bs 716 in RAN 108 via an S1 interface and may serve as a control node. For example, MME 718 may be responsible for authenticating users of devices 102, bearer activation or deactivation, selecting a particular serving gateway during an initial attach of devices 102, or the like. MME 718 may also provide a control plane function for switching between RAN 108 and other RANs (not shown) that employ other radio technologies, such as GSM or WCDMA.

Serving gateway 706 may be connected to each of eNode-Bs 716 in RAN 108 via the S1 interface. Serving gateway 720 may generally route or forward user data packets to or from the devices 102. Serving gateway 720 may also perform other functions, such as anchoring user planes during inter-eNode B handovers, triggering paging when downlink data is available for devices 102, managing or storing contexts of devices 102, or the like.

Serving gateway 720 may also be connected to PDN gateway 726, which may provide devices 102 with access to packet-switched networks, such as Internet 112, to facilitate communications between devices 102 and IP-enabled devices.

Core network 110 may facilitate communications with other networks. For example, core network 110 may provide devices 102 with access to circuit-switched networks, such as PSTN 113, to facilitate communications between devices 102 and traditional land-line communications devices. In addition, core network 110 may provide the devices 102 with access to other networks 114, which may include other wired or wireless networks that are owned or operated by other service providers.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
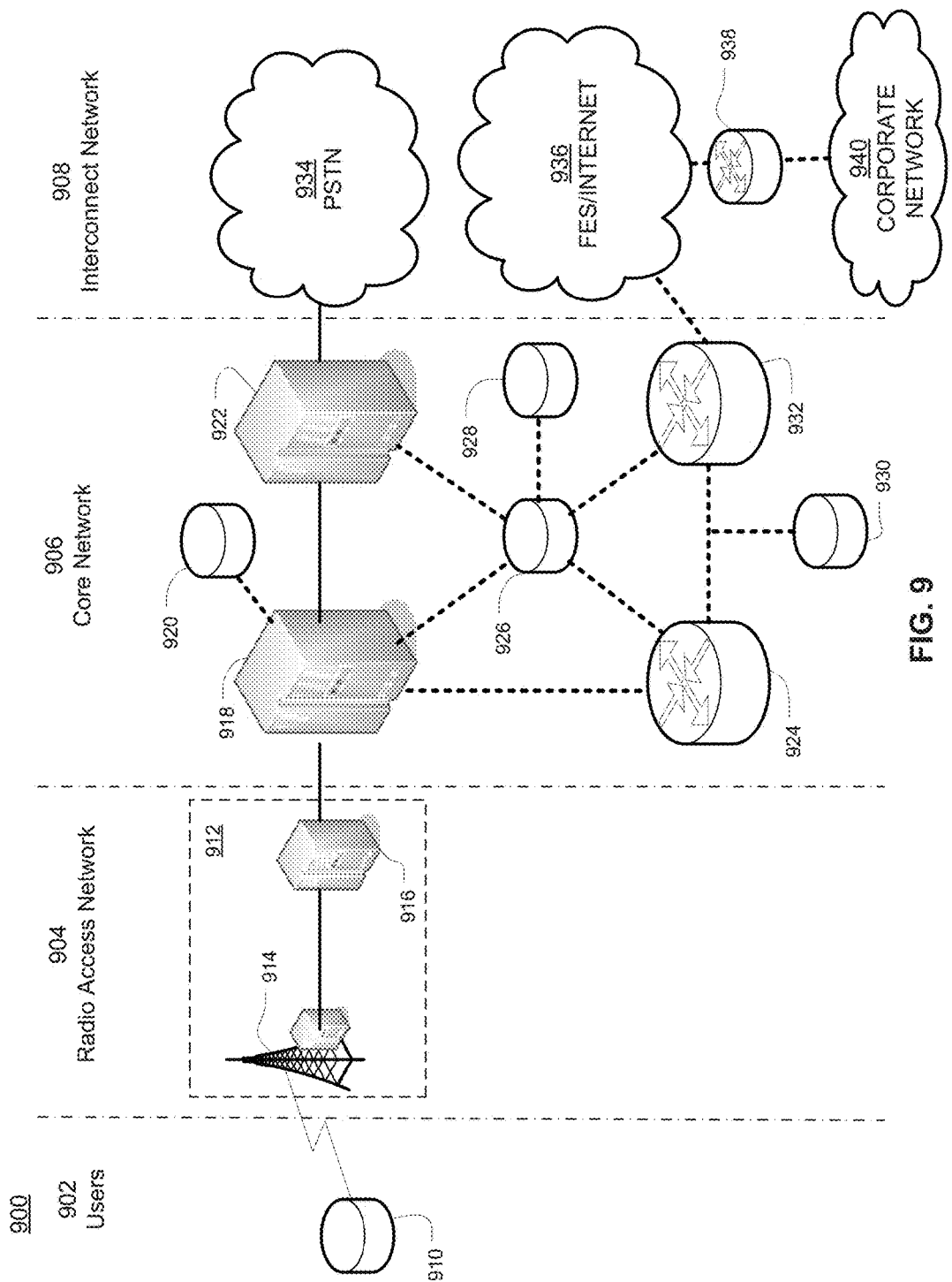
FIG. 9 illustrates an exemplary architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
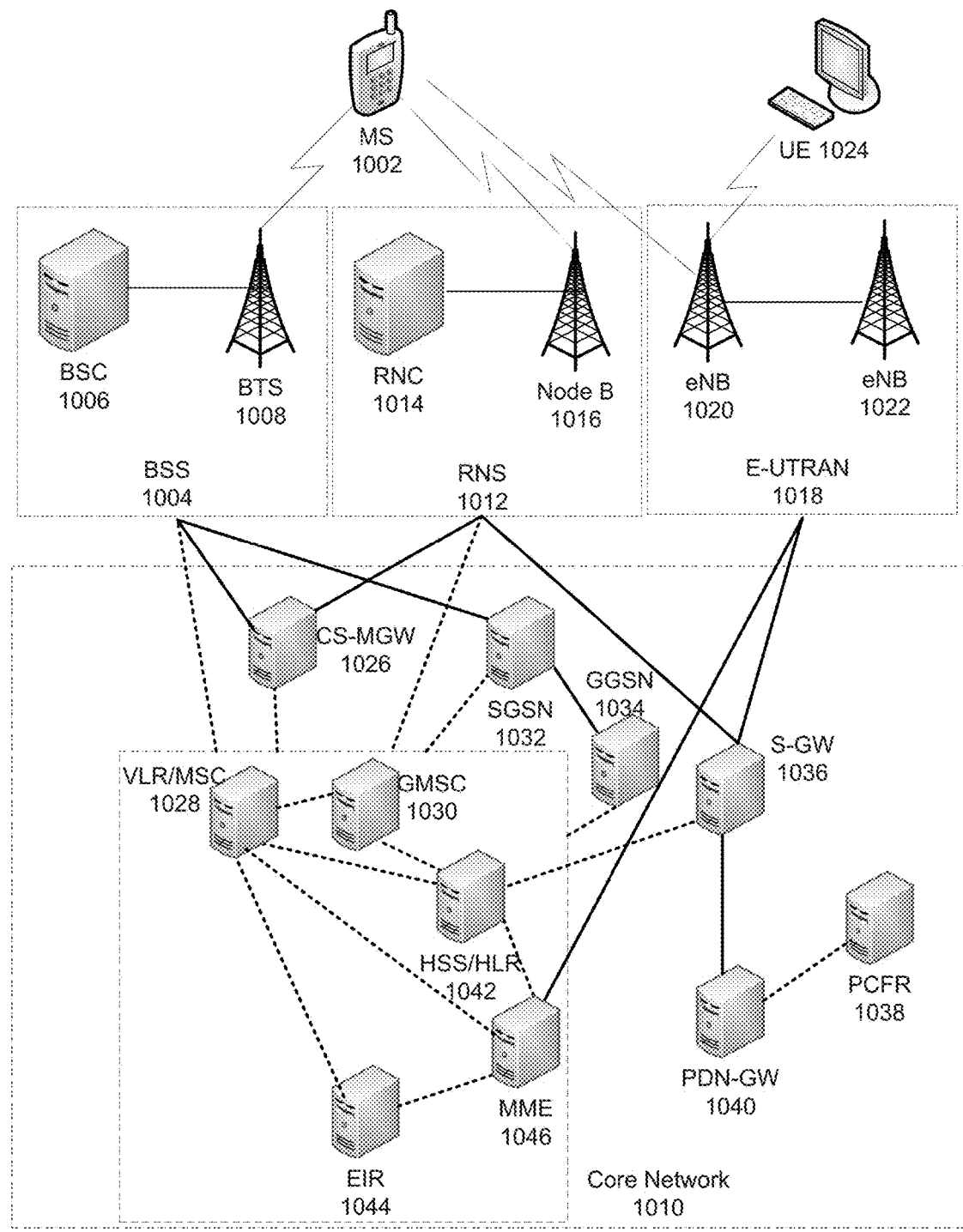
FIG. 10 is a block diagram of an exemplary public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, drone 102, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location data such as, but not limited to, GGSN address for each GGSN 1034 where an active PDP exists. GGSN 1034 may implement a location register function to store subscriber data it receives from SGSN 1032 such as subscription or location data.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location data. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location data to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed:

1. A method comprising:
   receiving, at an access point of a wireless local area network (WLAN), a wireless emergency alert (WEA) message, the WEA message comprising an alert and an indication of a geographic area in which the alert is to be communicated;
   comparing, by the access point, an access point location of the access point to the geographic area;
   based on the comparing, confirming that the access point location is within the geographic area;
   relaying the alert by the access point to a plurality of devices connected with the WLAN via the access point;
   receiving a second WEA message comprising an indication of a second geographic area;
   determining that the access point location is outside of the second geographic area; and
   based on the determining that the access point location is outside of the second geographic area, communicating an indication of the access point location to an alert system.

2. The method of claim 1, wherein relaying the alert further comprises relaying the indication of the geographic area.

3. The method of claim 2, wherein relaying the alert causes a first device of the plurality of devices to confirm that a device location of the first device is within the geographic area.

4. The method of claim 1, wherein relaying the alert comprises using an IEEE 802.11 protocol.

5. The method of claim 1, wherein receiving the WEA message at the access point comprises receiving the WEA message via the WLAN.

6. A wireless local area network (WLAN) access point comprising:
   a network connection for connecting to an Internet;
   a processor communicatively coupled to the network connection;
   a plurality of device connections for connecting a plurality of devices to the Internet, the plurality of device connections communicatively coupled to the processor; and
   memory storing instructions that cause the processor to effectuate operations, the operations comprising:

receiving, via the network connection, a message and an indication of a geographic area in which the message is to be communicated, wherein the message comprises a first wireless emergency alert (WEA) message;

determining that a location of the WLAN access point is located within the geographic area;

communicating an indication of the message to a plurality of devices via the plurality of device connections;

receiving from an alert system a second WEA message comprising an indication of a second geographic area;

determining that the location of the WLAN access point is outside of the second geographic area; and based on the determining that the location of the WLAN access point is outside of the second geographic area, communicating an indication of the location of the WLAN access point to the alert system.

7. The WLAN access point of claim 6, wherein the plurality of device connections comprise a plurality of access antennas.

8. The WLAN access point of claim 6, wherein communicating the indication of the message further comprises communicating an indication of the geographic area.

9. The WLAN access point of claim 6, wherein communicating the indication of the message comprises causing the plurality of devices to display the indication of the message.

10. The WLAN access point of claim 6, wherein receiving the message at the access point comprises receiving the first WEA message from an emergency alert server associated with a cellular network provider.

11. A computer readable storage medium storing computer executable instructions that when executed by a computing device cause said computing device to effectuate operations comprising:

receiving, via the network connection, a message and an indication of a geographic area in which the message is to be communicated, wherein the message comprises a first wireless emergency alert (WEA) message;

determining that a location of the WLAN access point is located within the geographic area;

communicating an indication of the message to the plurality of devices via a plurality of device connections;

receiving from an alert system a second WEA message comprising an indication of a second geographic area;

determining that the location of the WLAN access point is outside of the second geographic area; and based on the determining that the location of the WLAN access point is outside of the second geographic area, communicating an indication of the location of the WLAN access point to the alert system.

12. The computer readable storage medium of claim 11, wherein the plurality of device connections comprise a plurality of access antennas.

13. The computer readable storage medium of claim 11, wherein communicating the indication of the message further comprises communicating an indication of the geographic area.

14. The computer readable storage medium of claim 11, wherein communicating the indication of the message comprises causing the plurality of devices to display the indication of the message.

15. The computer readable storage medium of claim 11, wherein receiving the message at the access point comprises receiving the first WEA message from an emergency alert server associated with a cellular network provider.

* * * * *